United States Patent [19]

Ferreira do Espírito Santo

[11] Patent Number: 5,073,019
[45] Date of Patent: Dec. 17, 1991

[54] EXTERNAL REAR VIEW MIRROR ASSEMBLY FOR VEHICLES

[75] Inventor: Antonio Ferreira do Espírito Santo, Sao Paulo, Brazil

[73] Assignee: Metagal Industria e Comercio Ltda., Sao Paul, Brazil

[21] Appl. No.: 462,759

[22] Filed: Jan. 10, 1990

[51] Int. Cl.⁵ .................... G02B 7/18; B60R 1/06
[52] U.S. Cl. .................... 359/872; 248/478; 248/481; 248/484; 248/486
[58] Field of Search ............ 350/606, 631, 632, 639, 350/604; 248/476–487

[56] References Cited

U.S. PATENT DOCUMENTS

| | | | |
|---|---|---|---|
| 3,189,309 | 6/1965 | Hager | 248/478 |
| 4,031,771 | 6/1977 | Daly et al. | 248/479 |
| 4,165,156 | 8/1979 | O'Connell | 350/604 |
| 4,786,156 | 11/1988 | Kotani et al. | 248/479 |

FOREIGN PATENT DOCUMENTS

| | | | |
|---|---|---|---|
| 0223923 | 6/1987 | European Pat. Off. | 350/632 |
| 2419845 | 11/1979 | France | 248/479 |
| 0049538 | 3/1983 | Japan | 350/632 |
| 0139838 | 8/1983 | Japan | 350/632 |

Primary Examiner—Bruce Y. Arnold
Assistant Examiner—R. D. Shafer
Attorney, Agent, or Firm—Michael J. Striker

[57] ABSTRACT

A vehicle external rear view mirror assembly comprising a frame, a mirror secured in frame, a base for securing the frame with the mirror to a vehicle body, a lever assembly for rotatably connecting the frame with the mirror to the base, and an articulation assembly for pivotally attaching the frame with the mirror to the lever assembly.

2 Claims, 2 Drawing Sheets

EXTERNAL REAR VIEW MIRROR ASSEMBLY FOR VEHICLES

BACKGROUND OF THE INVENTION

The invention relates to external rear view mirror assembly for vehicles. The prior art discloses a number of designs of vehicle external rear view mirrors with some of them being hand adjustable. Hand-adjustable vehicle external rear view mirrors have a rather complex structure which presents difficulties in their manufacture and assembly, require use of costly materials and high expenditure of labor. All this drives their cost up. A significant number of designs of hand-adjustable external rear view mirrors are characterized by a relatively low stability during vehicle movement and by a relatively low resistance to the wind and vibrations. Some of the designs of the external rear view mirrors have a relatively high weight which complicates their mounting. Also hand-adjustable external rear view mirrors have a small range of adjustment.

SUMMARY OF THE INVENTION

The object of the invention is to provide an external hand-adjustable rear view mirror for vehicles which has a simple low-weight structure, can be securely attached to the vehicle, and can be easily and cheaply produced.

Another object of the invention is to provide an external hand-adjustable rear view mirror having a wide range of regulation.

The objects of the invention are achieved in an external rear view mirror assembly in which a frame with a mirror is pivotably secured to a lever which rotatably connects the frame with the mirror to a vehicle body.

The features and other objects of the present invention will be best understood from the following detailed description of the preferred embodiment with reference to the accompanying drawing.

DESCRIPTION OF THE PREFERRED EMBODIMENT

Figure 1:
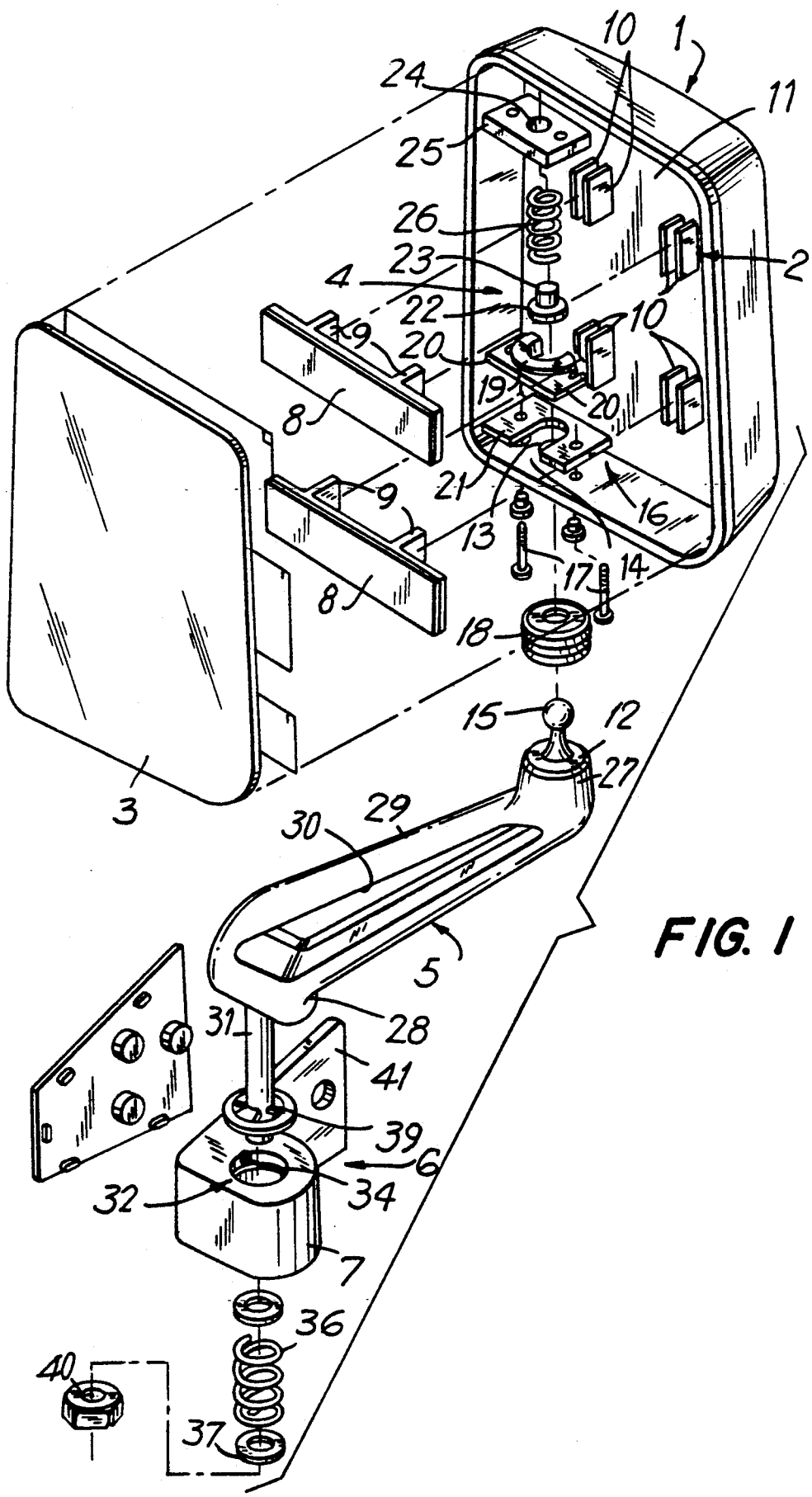
FIG. 1 shows an exploded view of an external rear view mirror assembly according to the invention.
Figure 2:
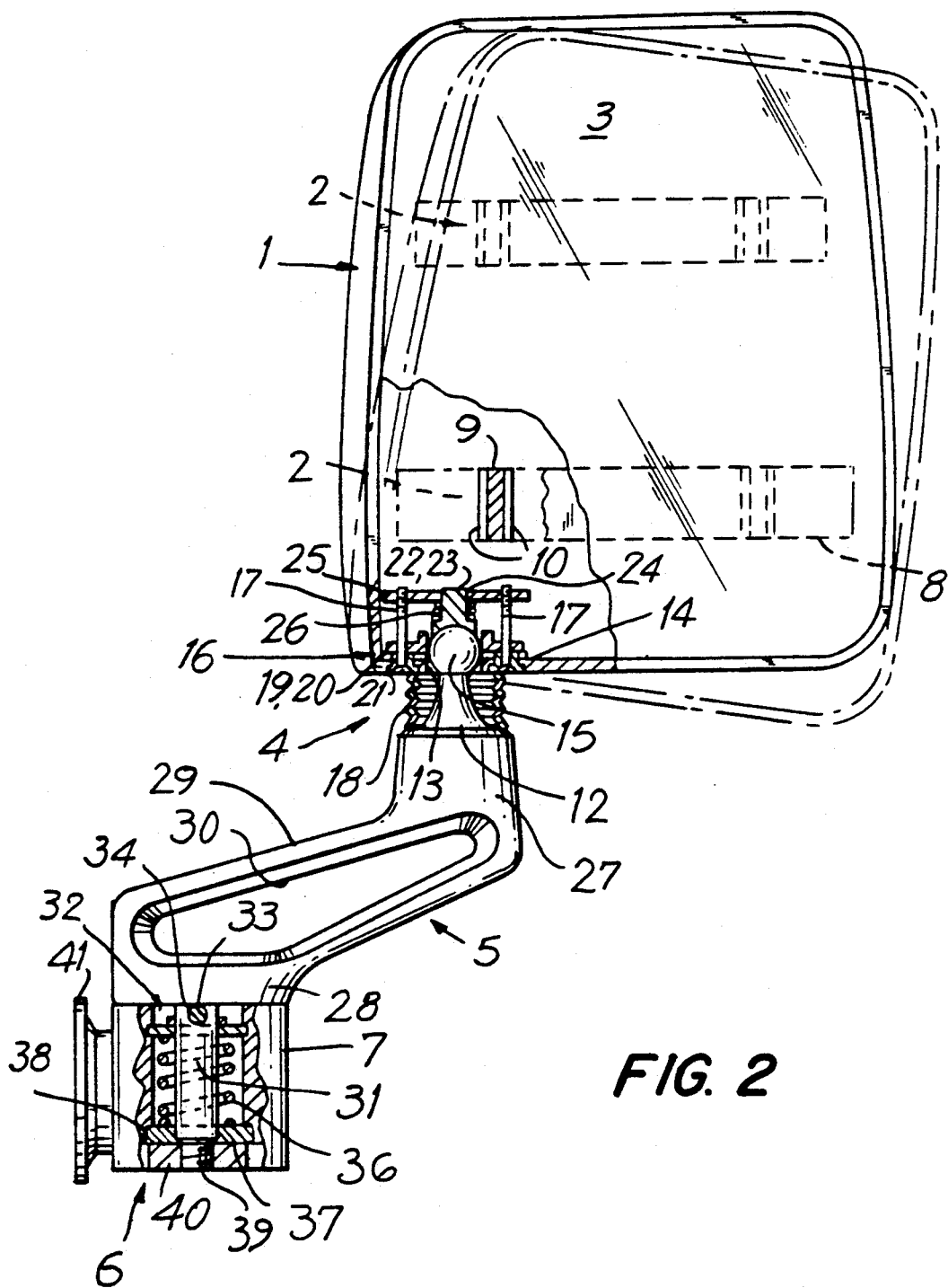
FIG. 2 shows a partial cross-sectional front view of an external rear view mirror assembly according to the invention in a mounted condition thereof.

As shown in FIG. 1, an external rear view window according to the invention comprises a substantially prismatic rectangular frame 1 having brackets 2 for receiving a mirror 3, and an articulation assembly 4. The articulation assembly 4 is pivotally attached to a lever 5. The lever 5 in turn is rotatable in a horizontal plane by a rotating structure 6. The rotation structure 6 is received in a base 7 which is secured to a vehicle body.

The mirror 3 is mounted in the brackets 2 by means of bars 8 secured to a rear side thereof. The bars 8 have attached thereto plates 9 which received between respective pairs of plates 10 of the bracket 2 which plate 10 projects from an internal surface of a bottom 11 of the frame 1.

The lever 5 with which the articulation assembly is connected, includes a projection 12 which extends through an opening 13 in the frame 1. At its free end, the projection 12 has a spherical portion 15 pivotably received in a plate seat 16 of the articulation assembly 4.

The projection 12 extends through a bushing 18 located between the frame and a surface of the lever 5 from which the projection 12 projects.

The plate seat 16 is attached to the frame 1 by screws 17. The plate seat 16 is formed of two members 19 and 20. The plate seat 16 overlies an U-shaped plate 21 which abuts interior surface 14 of the frame 1 in which the opening 13 is formed. The member 19 is a flat semicircular ring. The member 20 is a plate having an opening and a surface portion that extends beyond an outer circumference of the semicircular ring 19. The articulation assembly 4 further comprises a pin 23 having a head 22 within which the spherical portion 15 of the projection 12 is received. The pin 23 extends into an opening 24 of an upper plate 25. The pin 23 extends through a spring 26 arranged between an outer surface of the head 22 and an inner surface of the upper plate 25. The upper plate 25 is also secured to the frame 1 by screws 17.

The lever 5 comprises a tapered intermediate section 29 and two short vertically extending outer and inner end sections 27 and 28 located at opposite ends of the intermediate section 29. The intermediate section 29 is provided with a cavity 30.

The rotating structure 6 by which the lever 5 is attached to the base 7, includes a stub 31 projecting from the inner end section 28 of the lever 5 and received within a seat 32 of the base 7. A pin 33 extends transversely through the stub 31 and engages cut-outs 34 of a crown 35 provided around the stub. The stub 31 extends through a spring 36 located between a washer 37 secured in an annular groove 38 formed at a free end of the stub 31 and the crown 35. The free end of the stub 31 has a threaded portion 39 received in a nut 40 at the bottom of seat 32 which forms a part of the base 7. The seat 32 is formed as a tubular body from which tangentially extends a plate portion 41. The plate portion 41 has opening therein through which fixation means for securing the base 7 to a vehicle body extends.

The adjustment of an inclined position of the mirror 3 is effected by manipulation of the articulation assembly 4. As it is clear from the foregoing description, the articulation assembly 4 provides for adjustment of the mirror 3 within a wide range by enabling universal pivotal movement of the frame 1 with the mirror 3 fixed therein about the spherical portion 15 of the projection 12. The rotating structure 6 provides for different angular adjustment of the frame 1 with the mirror 3 about a vertical axis. Both the articulation assembly 4 and the rotating structure 5 insure the widest possible adjustment of the position of mirror 3 by hand.

While the invention has been illustrated and described with reference to a specific embodiment of an external rear view mirror, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. An external rear view mirror assembly for vehicles, comprising a frame; a mirror; means for securing said mirror in said frame; a base for securing said frame to a vehicle body; lever means for rotatably connecting said frame to said base; and articulation means for pivotally attaching said frame to said lever means; said lever means including a lever having an intermediate hollow section and two end sections extending vertically at opposite ends of said intermediate hollow section, and rotating means rotatably connecting one of said two end sections with said base, said base having a seat, said rotating means including a stub projecting from said one of said two end sections in said seat of said base, a crown secured to said stub and having radial cut-outs, a washer spaced from said crown and secured in an annular groove formed in said stub, a pin extending transversely through said stub and engaging said cut-outs in said crown, and a coil spring extending between said crown and said washer and surrounding said stub, said stub having a threaded end portion to be received in a nut.

2. An external rear view mirror assembly for vehicles, comprising a frame; a mirror; means for securing said mirror in said frame; a base for securing said frame to a vehicle body; lever means for rotatably connecting said frame to said base; and articulation means for pivotally attaching said frame to said lever means, said lever means including a lever having an intermediate hollow section and two end sections extending vertically at opposite ends of said intermediate hollow section, and rotating means rotatably connecting one of said two end sections with said base, said articulation means including a plate seat and a projection from another of said two end sections of said lever, extending through an opening in said frame, and pivotably received in said plate seat, said frame comprising a U-shaped plate secured in an area defining said opening in said frame through which said projection extends, said plate seat overlying said U-shaped plate and comprising a semi-circular ring and a plate having an opening and a surface portion extending beyond an outer circumference of said semi-circular ring, said articulation device further comprising a second plate spaced from said plate seat and a headed pin having a head portion and a pin portion received in an opening in said second plate, and a spring extending between said head portion and said second plate and surrounding said pin portion, said projection having a spherical end portion pivotably received within said head portion.

* * * * *